United States Patent
Sorrentino et al.

(10) Patent No.: US 9,980,193 B2
(45) Date of Patent: May 22, 2018

(54) TRANSPORT FORMAT FOR COMMUNICATIONS

(71) Applicant: Telefonaktiebolaget L M Ericsson (publ), Stockholm (SE)

(72) Inventors: Stefano Sorrentino, Solna (SE); Hieu Do, Solna (SE); Ricardo Blasco Serrano, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 260 days.

(21) Appl. No.: 14/692,895

(22) Filed: Apr. 22, 2015

(65) Prior Publication Data

US 2016/0174122 A1    Jun. 16, 2016

Related U.S. Application Data

(60) Provisional application No. 62/091,256, filed on Dec. 12, 2014.

(51) Int. Cl.
*H04W 36/22* (2009.01)
*H04W 72/04* (2009.01)
*H04B 1/3822* (2015.01)

(52) U.S. Cl.
CPC .......... *H04W 36/22* (2013.01); *H04B 1/3822* (2013.01); *H04W 72/0486* (2013.01)

(58) Field of Classification Search
CPC . H04W 36/22; H04W 72/0486; H04B 1/3822
USPC ................................. 370/310–350
See application file for complete search history.

(56) References Cited

U.S. PATENT DOCUMENTS

| | | | |
|---|---|---|---|
| 2005/0188015 A1* | 8/2005 | Attwell | H04L 12/2854 709/205 |
| 2005/0239413 A1* | 10/2005 | Wiberg | H04W 52/327 455/69 |
| 2013/0190025 A1* | 7/2013 | Sakata | H04W 52/243 455/501 |

(Continued)

FOREIGN PATENT DOCUMENTS

| | | |
|---|---|---|
| EP | 2 400 808 A1 | 12/2011 |
| EP | 2 624 604 A1 | 8/2013 |

(Continued)

OTHER PUBLICATIONS

ETSI TS 102 687 V1.1.1; Technical Specification; Intelligent Transport Systems (ITS); Decentralized Congestion Control Mechanisms for Intelligent Transport Systems operating in the 5 GHz range; Access layer part, 45 pages, Jul. 2011.

(Continued)

*Primary Examiner* — Paul H Masur
(74) *Attorney, Agent, or Firm* — Baker Botts, LLP

(57) ABSTRACT

A method in a wireless device is disclosed. The method comprises detecting that a load associated with a set of radio resources allocated for vehicle-to-other (V2x) communication exceeds a load threshold, the wireless device having a first transport format for V2x transmissions. The method further comprises upon detecting that the load associated with the set of radio resources allocated for V2x communication exceeds the load threshold, selecting a second transport format for use in a subsequent V2x transmission by the wireless device.

38 Claims, 8 Drawing Sheets

(56) References Cited

U.S. PATENT DOCUMENTS

| | | | | |
|---|---|---|---|---|
| 2013/0336120 A1* | 12/2013 | Bai | ........................ | G08G 1/161 |
| | | | | 370/235 |
| 2015/0113331 A1* | 4/2015 | Bhattacharya | ...... | G06F 11/3688 |
| | | | | 714/38.1 |
| 2015/0339748 A1* | 11/2015 | Huo | ........................ | G06Q 20/02 |
| | | | | 705/26.44 |
| 2016/0353343 A1* | 12/2016 | Rahman | ................. | H04W 36/30 |
| 2016/0374136 A1* | 12/2016 | Moisio | .................... | H04L 43/10 |

FOREIGN PATENT DOCUMENTS

| | | |
|---|---|---|
| WO | WO 2005/104454 A1 | 11/2005 |
| WO | WO 2014/012244 A1 | 1/2014 |

OTHER PUBLICATIONS

PCT, Notification of Transmittal of The International Search Report and The Written Opinion of The International Searching Authority, or the Declaration, International Application No. PCT/IB2015/059600, 12 pages, Feb. 17, 2016.

\* cited by examiner

TRANSPORT FORMAT FOR COMMUNICATIONS

PRIORITY

This application claims the benefit under 35 U.S.C. § 119(e) of the priority of U.S. Provisional Application 62/091,256 filed on Dec. 12, 2014, entitled "Transport Format for Communications," the entire disclosure of which is hereby incorporated by reference.

TECHNICAL FIELD

The present disclosure relates, in general, to wireless communications, and, more particularly, to transport formats for wireless communications.

BACKGROUND

The Long Term Evolution (LTE) standard has been extended with support of device to device (D2D) (specified as "sidelink") features targeting both commercial and Public Safety applications. Applications include device discovery, where devices are able to sense the proximity of another device and associated application by broadcasting and detecting discovery messages that carry device and application identities. Another application includes direct communication based on physical channels terminated directly between devices.

A potential extension of the D2D features is vehicle-to-"other" communication (V2x). V2x communication, also referred to as vehicle-to-vehicle/infrastructure or vehicle-to-anything imaginable, includes any combination of direct communication between vehicles (V2V), pedestrians (V2P), and/or infrastructure (V2I). V2x communication may take advantage of a network infrastructure, when available, but at least basic V2x connectivity should be possible even in case of lack of coverage. Providing an LTE-based V2x interface may be economically advantageous because of the LTE economies of scale, and it may enable tighter integration between communications with the network infrastructure (e.g., V2I) and V2P and V2V communications, as compared to using a dedicated V2x technology.

V2x communications may carry both non-safety and safety information, where each of the applications and services may be associated with specific requirements sets, e.g., in terms of latency, reliability, capacity, etc. ETSI has defined two types of messages for road safety: the Co-operative Awareness Message (CAM) and the Decentralized Environmental Notification Message (DENM).

The CAM message is intended to enable vehicles, including emergency vehicles, to notify their presence and other relevant parameters in a broadcast fashion. Such messages target other vehicles, pedestrians, and infrastructure, and are handled by their applications. CAM messages also serve as active assistance to safety driving for normal traffic. The availability of a CAM message is indicatively checked for every 100 ms, yielding a maximum detection latency requirement of less than 100 ms for most messages. However, the latency requirement for a pre-crash sensing warning is 50 ms.

The DENM message is event-triggered, such as by braking, and the availability of a DENM message is also checked for every 100 ms. The requirement of maximum latency is less than 100 ms.

The package size of CAM and DENM messages varies from 100+ to 800+ bytes, and the typical size is around 300 bytes. The message is supposed to be detected by all vehicles in proximity.

The SAE (Society of the Automotive Engineers) has also defined the Basic Safety Message (BSM) for Dedicated Short Range Communications (DSRC), with various message sizes defined. According to the importance and urgency of the messages, the BSMs are further classified into different priorities.

In cases of high user density, the contention-based spectrum used by V2x UEs may become highly fragmented. This may prevent high efficiency in the resource utilization in cases where high resource load needs to be accomplished. An existing solution is to use Decentralized Congestion Control (DCC) algorithms (such as, for example, ETSI TS 102 687) in high resource load situations. DCC algorithms reduce the load by means of increasing the transmit data rate or by reducing the packet rate. Similarly, DCC algorithms use power control to reduce interference. These methods, however, may not reduce spectrum fragmentation, or do so at the expense of reducing the number of transmissions (i.e., reducing the packet rate). Thus, there is a need for an improved manner of handling high resource load situations that reduces resource fragmentation.

SUMMARY

To address the foregoing problems with existing solutions, disclosed is a method in a wireless device. The method comprises detecting that a load associated with a set of radio resources allocated for vehicle-to-other (V2x) communication exceeds a load threshold, the wireless device having a first transport format for V2x transmissions. The method further comprises upon detecting that the load associated with the set of radio resources allocated for V2x communication exceeds the load threshold, selecting a second transport format for use in a subsequent V2x transmission by the wireless device.

In certain embodiments, detecting that the load associated with the set of radio resources allocated for V2x communication exceeds the load threshold may comprise obtaining load information from a network node. In certain embodiments, the method may further comprise initiating a timer in response to detecting that the load associated with the set of radio resources allocated for V2x communication exceeds the load threshold, and determining that the load associated with the set of radio resources allocated for V2x communication exceeds the load threshold for a threshold duration.

In certain embodiments, selecting the second transport format for use in a subsequent V2x transmission by the wireless device may comprise modifying the first transport format to the second transport format based at least in part on available radio resources of the set of radio resources allocated for V2x communication. The second transport format may be adapted to available radio resources of the set of radio resources allocated for V2x communication. The first transport format and the second transport format may have at least one different radio parameter comprising one or more of a channel bandwidth, a power, a number of retransmissions, a modulation scheme, a coding scheme, and a resource hopping pattern. In certain embodiments, selecting the second transport format for use in a subsequent V2x transmission by the wireless device may comprise selecting an alternative transport format as the second transport format, the alternative transport format configured for use when the load associated with the set of radio resources allocated for V2x communication exceeds the load threshold. One or more radio parameters of the alternative transport format may be preconfigured in the wireless device. The method may further comprise receiving one or more radio parameters of the alternative transport format from a network node.

In certain embodiments, the method may further comprise upon detecting that the load associated with the set of radio resources allocated for V2x communication exceeds the load threshold, dropping a transmission based at least in part on one or more of a type of information carried by a channel and a priority of information carried by a channel. The method may further comprise upon detecting that the load associated with the set of radio resources allocated for V2x communication exceeds the load threshold, reducing a transmission rate based at least in part on one or more of a type of information carried by a channel and a priority of information carried by a channel.

Also disclosed is a wireless device. The wireless device comprises one or more processors. The one or more processors are configured to detect that a load associated with a set of radio resources allocated for vehicle-to-other (V2x) communication exceeds a load threshold, the wireless device having a first transport format for V2x transmissions. The one or more processors are configured to, upon detecting that the load associated with the set of radio resources allocated for V2x communication exceeds the load threshold, select a second transport format for use in a subsequent V2x transmission by the wireless device.

Also disclosed is a method in a network node. The method comprises determining that a load associated with a set of radio resources allocated for vehicle-to-other (V2x) communication exceeds a load threshold. The method further comprises communicating one or more radio parameters of an alternative transport format to a wireless device, the alternative transport format configured for use when the load associated with the set of radio resources allocated for V2x communication exceeds the load threshold.

In certain embodiments, the method may further comprise communicating load information to the wireless device, the load information providing an indication that the load associated with the set of radio resources allocated for V2x communication exceeds the load threshold. The load information may be associated with a subset of the resources allocated for V2x communication. The alternative transport format may comprise one or more of a smaller channel bandwidth than a first transport format associated with the wireless device, a smaller number of retransmissions than the first transport format associated with the wireless device, and a lower power than the first transport format associated with the wireless device. The alternative transport format may be based at least in part on available resources of the set of radio resources allocated for V2x communication. The one or more radio parameters may comprise one or more of a channel bandwidth, a power, a number of retransmissions, a modulation scheme, a coding scheme, and a resource hopping pattern. The method may further comprise preventing access to the set of radio resources allocated for V2x communication by wireless devices using an inefficient resource allocation scheme. The inefficient resource allocation scheme may comprise a random resource allocation scheme.

Also disclosed is a network node. The network node comprises one or more processors. The one or more processors are configured to determine that a load associated with a set of radio resources allocated for vehicle-to-other (V2x) communication exceeds a load threshold. The one or more processors are configured to communicate one or more radio parameters of an alternative transport format to a wireless device, the alternative transport format configured for use when the load associated with the set of radio resources allocated for V2x communication exceeds the load threshold.

Certain embodiments of the present disclosure may provide one or more technical advantages. For example, certain embodiments may enable higher system-level resource efficiency. As another example, certain embodiments may make selection of orthogonal resources easier for a distributed resource allocation algorithm. As yet another example, certain embodiments may allow a higher load to be supported. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, in cases where there is a high load associated with resources allocated for V2x communication, the resources may become highly fragmented. V2x communication presents a number of potential applications. A transport format (TF) that may be suitable for one application may have different characteristics (e.g., channel bandwidth (BW), number of retransmissions of a given message, modulation/coding scheme, power, resource hopping pattern, etc.) than the TF of another application. Thus, as the load on a set of resources allocated for V2x communication increases (such as, for example, when the number of devices contending for the same resources increases), so does the likelihood that the set of resources are being used by multiple wireless devices using different TFs. The resource fragmentation that may result in such a scenario can be problematic, potentially resulting in inefficient resource utilization. The present disclosure contemplates various embodiments that may address these and other issues relating to resource fragmentation in a wireless communications network.

Figure 1:
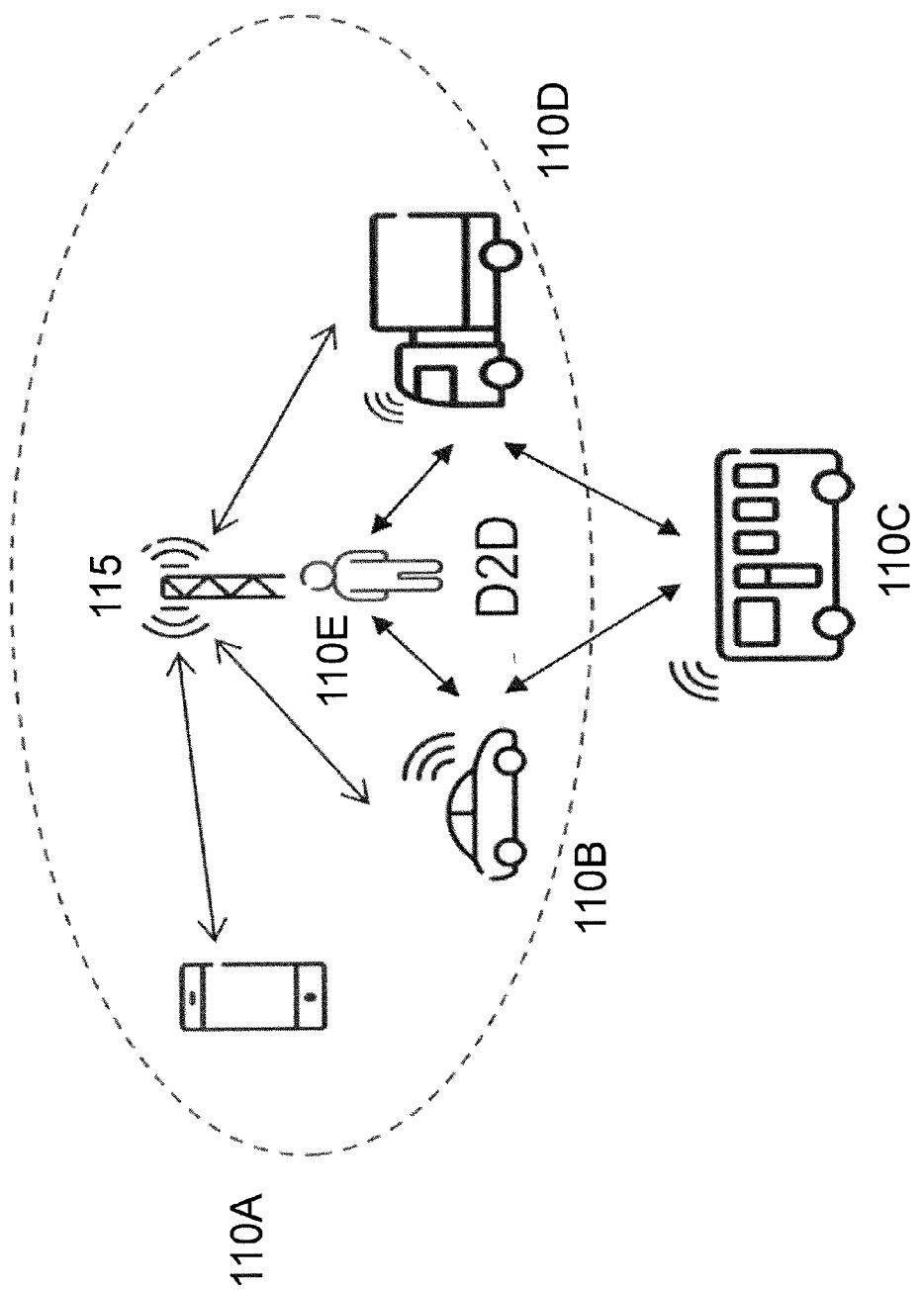
FIG. 1 illustrates an embodiment of a wireless communications network, in accordance with certain embodiments.

FIG. 1 illustrates an embodiment of a wireless communications network 100, in accordance with certain embodiments. More particularly, network 100 includes one or more wireless device(s) 110 (which may be interchangeably referred to as UEs 110) and network node(s) 115 (which may be interchangeably referred to as eNBs 115). More particularly, wireless device 110A is a smart phone, wireless devices 110B-D are vehicles, and wireless device 110E is a pedestrian having a wireless device 110, such as, for example, a smart phone. Wireless devices 110 may communicate with a radio network node 115, or with one or more other wireless devices 110 over a wireless interface. For example, wireless devices 110A, 110B, and 110D may transmit wireless signals to radio network node 115 and/or receive wireless signals from radio network node 115. Wireless devices 110 may also transmit wireless signals to other wireless devices 110 and/or receive wireless signals from other wireless devices 110. For example, wireless devices 110B, 110C, 110D, and 110E may communicate using D2D communication. The wireless signals may contain voice traffic, data traffic, control signals, and/or any other suitable information. In some embodiments, an area of wireless signal coverage associated with network node 115 may be referred to as a cell.

In certain embodiments, network node 115 may interface with a radio network controller. The radio network controller may control network node 115 and may provide certain radio resource management functions, mobility management functions, and/or any other suitable functions. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding.

In some embodiments, the core network node may manage the establishment of communication sessions and various other functionalities for wireless device 110. Wireless device 110 may exchange certain signals with the core network node using the non-access stratum layer. In non-access stratum signaling, signals between wireless device 110 and the core network node may be transparently passed through the radio access network. Example embodiments of wireless device 110, radio network node 115, and other network nodes (such as a radio network controller or core network node) are described with respect to FIGS. 6, 7, and 8, respectively.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115. Although the various embodiments may be described in the context of LTE networks, the present disclosure contemplates that the various embodiments may be applied to LTE evolution or to any other wireless systems, including 5G standards. Furthermore, although certain embodiments may be described in the context of V2x applications, the various embodiments may be advantageously applied to other applications.

As described above, V2x communication may include any combination of direct communication between vehicles, pedestrians, and infrastructure. FIG. 1 illustrates a variety of V2x scenarios in which the various embodiments of the present disclosure may be applied. As an example of V2I communication, wireless device 110A, 110B, and 110D may communicate wirelessly with network node 115. As an example of V2P communication, wireless devices 110B and 110D may communicate with a pedestrian having a wireless device 110E. As an example of V2V communication, wireless devices 110B, 110C, and 110D may communicate wirelessly with each other. Although certain embodiments may describe V2x communication in terms of a vehicle transmitting to a pedestrian, infrastructure, or other vehicle, the present disclosure contemplates that V2x communication also includes a vehicle receiving messages from infrastructure, pedestrians (P2V), and other vehicles (V2V), as well as communication between pedestrians and infrastructure (P2I).

V2x resource allocation schemes may in general be based on a hybrid combination of centralized network-based resource allocation and distributed UE-based resource allocation. For example, in certain embodiments the network node may provide a set (pool) of contention-based resources for V2x transmission, and wireless devices 110 may select resources within the provided pool. The resource selection may be based on schemes that sense the interference and usage of a set of potential resources, and strive for usage of free or underutilized radio resources. In general, V2x resources are expected to be multiplexed at least in both time (TDMA) and frequency (FDMA) domains. Reasonable resource allocation algorithms may strive to avoid even partial overlaps between occupied time/frequency radio resources and those selected for V2x transmission.

A number of potential applications are envisioned for V2x. Depending on the application, the most suitable radio transport format (TF) may have different characteristics in terms of, for example, channel BW, number of retransmissions of a given message, modulation/coding scheme, power, resource hopping pattern, etc. As a consequence, a pool of contention-based resources for V2x communication may be used at a given time by multiple wireless devices 110 using different TFs.

One issue with the coexistence of multiple TFs within the same pool of resources is that orthogonal resource pattern schemes associated to different TFs may not allow for full usage of the system-level radio resources. In some instances, this may be because of resource fragmentation. The problem is even larger in the case of distributed resource allocation, when a central scheduler that performs a centralized optimal resource allocation is not available. Resource fragmentation may be a particularly relevant problem for high-load scenarios. A high-load scenario may exist when many wireless devices 110 contend for the same resources. Efficient resource utilization may be critical in a high-load scenario. In certain circumstances, a potential consequence of resource fragmentation is that some resource collisions may occur, which reduces the reliability and range of V2x channels. An example of fragmented radio resources is described in more detail below in relation to FIG. 2.

The present disclosure contemplates various embodiments that may address the problem of resource fragmentation that may result from the use of different TFs. In certain embodiments, wireless device 110 may have a first TF for V2x transmissions. Wireless device 110 may detect a high-load situation for the V2x resources. Wireless device 110 may detect a high-load situation in any suitable manner. For example, wireless device 110 may detect that a load associated with a set of radio resources allocated for V2x communication exceeds a load threshold. The load threshold may be defined in any suitable manner, and may vary according to particular applications. In certain embodiments, the load threshold may be preconfigured. In certain embodiments, the load threshold may be dynamically configured. The load threshold may be defined by any suitable component of network 100. For example, the load threshold may be defined by network node 115.

Wireless device 110 may detect that the load associated with the set of radio resources exceeds the load threshold in any suitable manner. As one example, wireless device 110 may perform the detection, such as, for example, by energy sensing or other suitable mechanism. As another example, wireless device 110 may obtain load information from any suitable source, such as, for example, network node 115. Wireless device 110 may obtain load information from network node 115 in any suitable manner. In certain embodiments, wireless device 110 may obtain load information from network node 115 via one or more signaling procedures. The load information may contain any suitable information. For example, the load information may be associated to a subset of the resources used for V2x (e.g., one of multiple V2x resource pools), or may be associated with the entire set of radio resources allocated for V2x communication.

In certain embodiments, a timer may be initiated upon detection of a high load. The timer may be initiated by any suitable component of network 100. For example, in certain embodiments, wireless device 110 may initiate the timer. As another example, network node 115 may initiate the timer. In certain embodiments, wireless device 110 or network node 115 may be configured such that a load needs to be detected for at least a threshold duration of time before wireless device 110 performs one or more radio operations, such as radio operations related to TFs. The threshold duration may be any suitable duration, and may vary according to particular applications.

In certain embodiments, upon detecting that the load associated with the set of radio resources allocated for V2x communication is above the load threshold, wireless device 110 may perform one or more radio operations that may enable higher system-level resource efficiency. For example, in case of high load, wireless device 110 may select a second TF. In certain embodiments, wireless device 110 may take other measures to enable efficient system-level resource allocation. For example, wireless device 110 may be constrained to use V2x physical channels with a predefined fixed time/frequency allocation, to reduce spectrum fragmentation when frequency multiplexing multiple channels within a subframe according to some (distributed) resource allocation scheme. The different actions described herein may be triggered by any suitable events, and load thresholds, or any other suitable criteria.

As one example, upon detecting that the load associated with the set of radio resources allocated for V2x communication is above the load threshold, wireless device 110 may select a second TF for use in a subsequent V2x transmission by wireless device 110. The second TF may be an alternative TF to be used in high-load situations. The alternative TF format may be associated with a set of one or more radio parameters. The radio parameters of such an alternative TF (such as, for example, BW, power, number of retransmissions, or any other suitable parameter) may be determined in any suitable manner. For example, in certain embodiments the one or more radio parameters associated with the alternative TF may be signaled by network node 115 or any other suitable element of network 100. As another example, the one or more radio parameters associated with the alternative TF may be pre-configured in wireless device 110.

The use of an alternative TF in response to a high-load scenario may be advantageous. For example, in certain embodiments, if multiple wireless devices 110 detect a high-load scenario, they may start using TFs with the same BW, number of retransmissions, and compatible hopping patterns. As a result, it may become easier for the distributed resource allocation algorithm to select orthogonal resources. Furthermore, from a system-level perspective, resource fragmentation may be reduced, and higher load can be supported. In certain embodiments, the alternative TF may be associated with smaller BW, fewer retransmissions, and a lower power than the default transmission parameters.

As another example, in certain embodiments wireless device 110 may detect a high load associated with the set of radio resources allocated for V2x communication or detect a fragmented resource allocation. Upon detecting the high load or fragmented resource allocation, wireless device 110 may select a second TF for use in a subsequent V2x transmission by the wireless device. The second TF may be a different TF that may provide reduced resource fragmentation. For example, in such an embodiment, all wireless devices 110 may use the same channel BW, even though different devices may have a different number of retransmissions. As a result, it may be easier for additional devices to access the shared pool of radio resources without increasing interference. An example of the reduced resource fragmentation that may potentially be achieved by one or more of the embodiments described herein is described in more detail below in relation to FIG. 3.

As yet another example, in certain embodiments, upon detecting that the load associated with the radio resources allocated for V2x communication exceeds the load threshold, wireless device 110 may drop a transmission or reduce a transmission rate of a transmission. In certain embodiments, wireless device 110 may drop a transmission or reduce a transmission rate in a selective way. For example, wireless device 110 may drop a transmission or reduce a transmission rate based on any suitable criteria. For example, in certain embodiments, wireless device 110 may drop a transmission or reduce the transmission rate based at least in part on one or more of a type of information carried by a certain V2x channel, an information priority carried by a certain V2x channel, and any other suitable criteria. As one example, a non-safety-critical transmission may be dropped in case of a high-load scenario.

As yet another example, wireless device 110 may have a preferred TF as its first TF. Wireless device 110 may detect that the preferred TF does not fit the available radio resources. In certain embodiments, wireless device 110 may determine the available resources based on a resource sensing operation, signaling from another node, such as network node 115, or any other suitable manner. Upon detecting that a load associated with the set of radio resources allocated for V2x communication, wireless device 110 may select a second TF for use in a subsequent V2x transmission by wireless device 110. In certain embodiments, selecting the second TF may comprise modifying its first TF in order to more easily fit it in the available radio resources. In modifying its TF in order to more easily fit it in the available radio resources, wireless device 110 may modify one or more radio parameters. For example, if a high-load scenario is detected, a wireless device 110 attempting to access the shared pool of radio resources allocated for V2x communication may modify its TF to a second TF having sufficiently narrow BW and sufficiently few retransmissions in order to fit the available resources.

As yet another example, in certain embodiments, upon detecting a high-load on V2x resources, inefficient resource allocation schemes may be prevented from accessing V2x resources with a high load. In such an embodiment, network node 115 may prevent a wireless device 110 employing an inefficient resource allocation scheme from accessing the set of radio resources allocated for V2x communication. Any suitable criteria may be used to determine what resource allocation schemes constitute an inefficient resource allocation scheme, and the criteria for an inefficient resource allocation scheme may vary according to particular applications. For example, in certain embodiments a random resource allocation scheme may be determined to be inefficient, and one or more wireless devices 110 employing a random resource allocation scheme may be prevented from accessing the set of radio resources allocated for V2x communication. In some cases, wireless devices that do not adopt a second transport format upon detecting that a load associated with a set of radio resources exceeds a load threshold may autonomously prevent access to the allocated set of radio resources for V2x communications.

Figure 2:
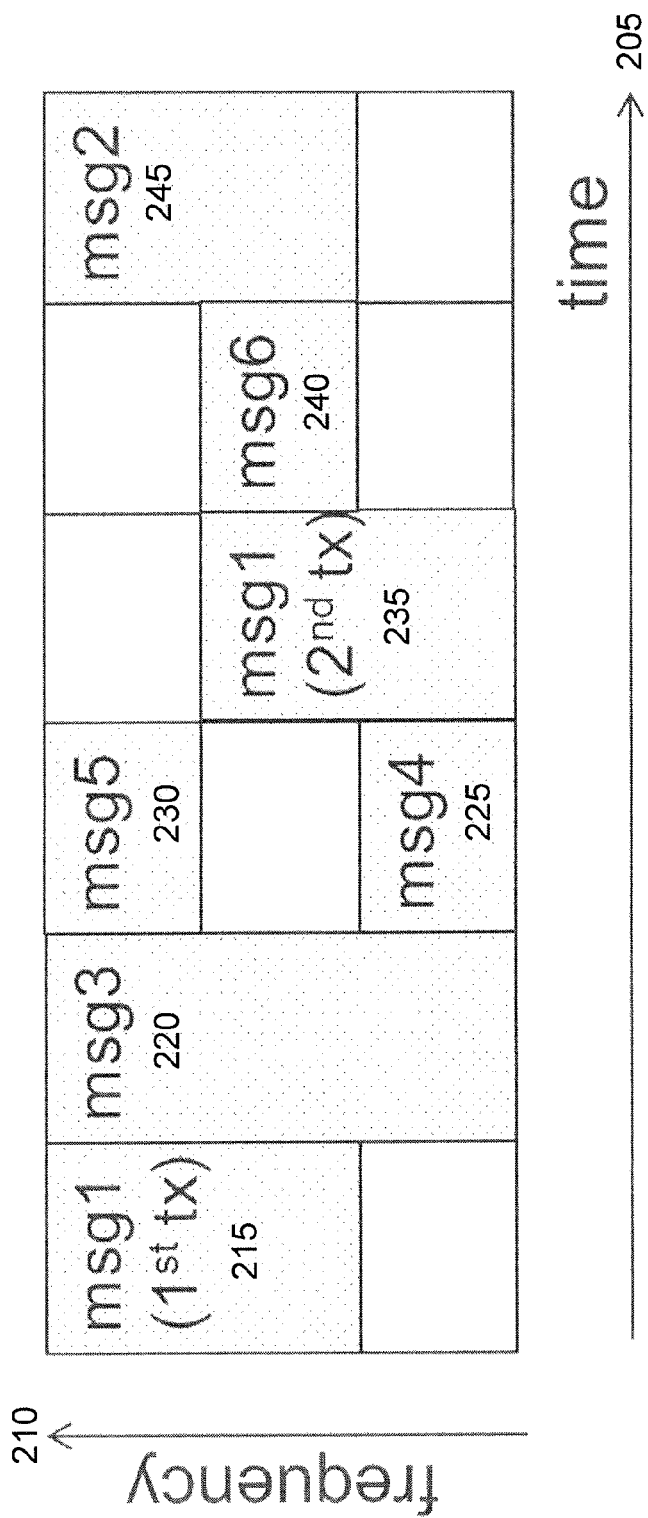
FIG. 2 illustrates an example of fragmented radio resources, in accordance with certain embodiments.

FIG. 2 illustrates an example of fragmented radio resources, in accordance with certain embodiments. More particularly, FIG. 2 illustrates message 1 (1st transmission) 215, message 3 220, message 4 225, message 5 230, message 1 (2nd transmission) 235, message 6 240, and message 2 245. In certain embodiments, the various messages 215-245 may be any suitable message. For example, in certain embodiments, messages 215-245 may include one or more CAM, DENM, or BSM messages.

As described above, reasonable resource allocation algorithms strive to avoid even partial overlap between occupied time/frequency radio resources and those selected for V2x transmission. The use of such a resource allocation algorithm may result in the fragmented resource allocation illustrated in FIG. 2, wherein even partial overlap between occupied time/frequency radio resources is avoided. Where resource fragmentation exists, the coexistence of multiple TFs within the same pool of resources may not allow for full usage of the system-level radio resources. For example, in FIG. 2 adding a channel with large bandwidth could lead to resources overlapping and interference, even though the system resource utilization is only ⅔ in this example. An example of a more efficient resource allocation scheme that may be achieved as a result of one or more of the embodiments described herein is described below in relation to FIG. 3.

Figure 3:
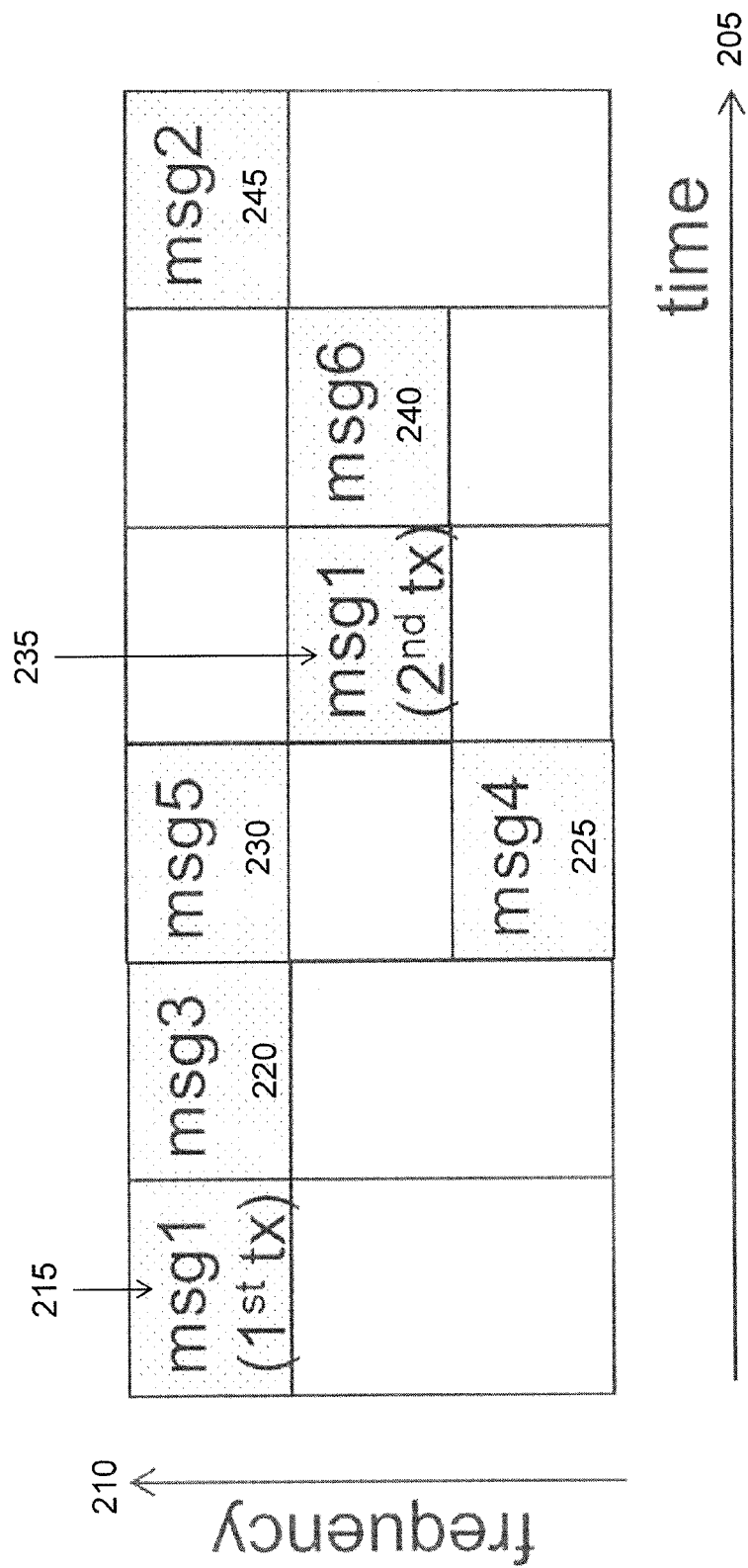
FIG. 3 illustrates an example of reduced fragmentation of radio resources, in accordance with certain embodiments.

FIG. 3 illustrates an example of reduced fragmentation of radio resources, in accordance with certain embodiments. Similar to FIG. 2, FIG. 3 illustrates message 1 (1st transmission) 215, message 3 220, message 4 225, message 5 230, message 1 (2nd transmission) 235, message 6 240, and message 2 245. Note, however, that unlike the resource allocation illustrated in FIG. 2, the fragmentation of radio resources is reduced through the use of modified and/or alternative transport formats.

In certain embodiments, the resource allocation scheme described above may be achieved using one or more of the various embodiments described above. For example, one or more wireless devices in the network may select an alternative TF intended for use in a high-load scenario associated with the set or radio resources allocated for V2x communication. As another example, one or more wireless devices in the network may select a different TF that allows for reduced resource fragmentation, such as, for example, a TF in which all or many wireless devices use the same channel BW. As yet another example, the resource allocation described in FIG. 3 may be achieved by one or more wireless devices modifying one or more preferred TFs to better fit the available set of radio resources allocated for V2x communication.

To illustrate, consider the following scenario. A wireless device, such as wireless device 110 described above in relation to FIG. 1, may be a V2x capable device operating in a wireless network. Wireless device 110 may be using V2x communication for a particular application. Under typical load conditions (i.e., when the load on radio resources allocated for V2x communication is below a load threshold), the wireless device may use a first TF for the particular application of V2x communication. The first TF may have certain characteristics (i.e., channel BW, number of retransmissions of a given message, modulation/coding scheme, power, resource hopping pattern, etc.).

Over time, however, load conditions related to the resources allocated for V2x communication in the network may change. For example, the number of devices contending for the same set of radio resources allocated for V2x communication may increase. As described above, the many devices contending for the same set of resources allocated for V2x communication may use V2x communication for a variety of applications. These various applications may use different TFs that may be different from the first TF used by the wireless device. The use of different TFs by the many devices may result in resource fragmentation, potentially resulting in a resource allocation similar to the resource allocation described above in relation to FIG. 2. This resource fragmentation can lead to poor utilization of resources overall.

The wireless device may detect that the load associated with the set of radio resources allocated for V2x communication exceeds the load threshold. As described above, the wireless device may detect that the load associated with the set of resources allocated for V2x communication exceeds the load threshold in any suitable manner. For example, the wireless device may detect the load is above the load threshold based on one or more measurements performed by the wireless device. As another example, the wireless device may obtain load information from a network node.

Upon detecting that the load associated with the set of resources allocated for V2x communication exceeds the load threshold, the wireless device may select a second TF for use in a subsequent V2x transmission by the wireless device. For example, the wireless device may select an alternative TF to use while the load associated with the set of resources allocated for V2x communication exceeds the load threshold. The alternative TF may be designed for use when the load exceeds the load threshold. The radio parameters (e.g., channel BW, power, number of retransmissions, modulation scheme, coding scheme, resource hopping pattern, etc.) of the alternative TF may be preconfigured in the wireless device, or may be received from a network node, such as network node 115 described above in relation to FIG. 1. For example, the one Or more radio parameters of the alternative TF may be communicated to the wireless device by a network node as part of the load information, or as part of a separate communication from the network node to the wireless device.

The wireless device may be only one of many wireless devices that detect that the load associated with the radio resources allocated for V2x communication exceeds the load threshold, and selects a second TF for use in subsequent V2x transmissions. Thus, resource fragmentation of the set of radio resources allocated for V2x communication may be decreased, increasing the potential for efficient resource utilization. The wireless device may take additional actions that may reduce resource fragmentation. For example, the wireless device may drop a transmission or reduce a transmission rate. The wireless device may drop a transmission rate or reduce the transmission rate based on the type of information carried by a channel and/or the priority of information carried by the channel.

The scenario described above illustrates one of a variety of ways in which the wireless device might select a second TF upon detecting that the load associated with the set of radio resources allocated for V2x communication exceeds the load threshold. As described herein, the present disclosure contemplates a variety of embodiments that may result in the reduced resource fragmentation of the resource allocation shown in FIG. 4. For example, the wireless device may modify the first transport format to a second transport format based at least in part on the available radio resources of the set of radio resources allocated for V2x communication.

Figure 4:
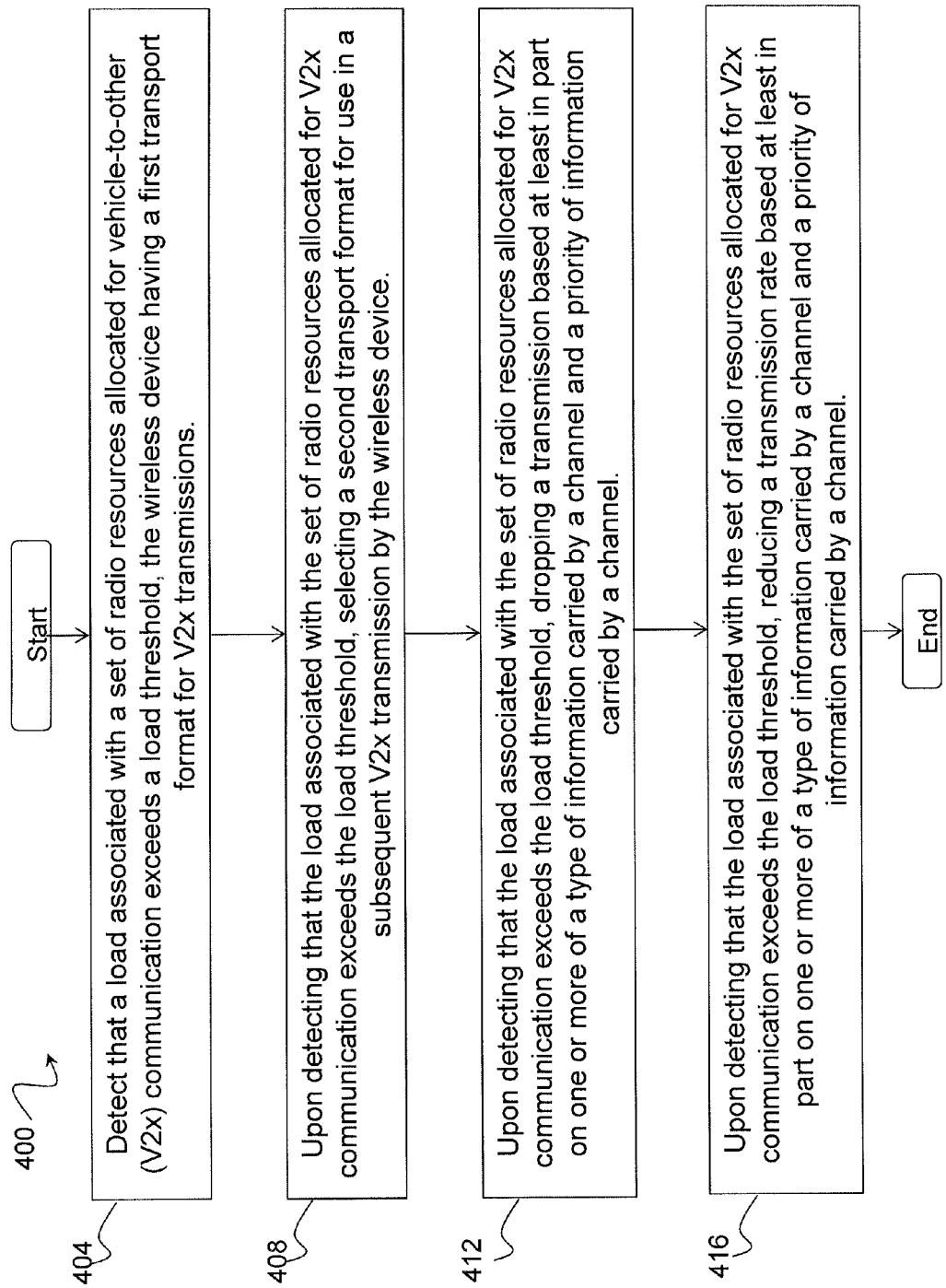
FIG. 4 is a flow chart of a method in a wireless device, in accordance with an embodiment.

FIG. 4 is a flow chart of a method in a wireless device, in accordance with an embodiment. The method begins at step 404, where a wireless device detects that a load associated with a set of radio resources allocated for vehicle-to-other (V2x) communication exceeds a load threshold, the wireless device having a first transport format for V2x transmissions. In certain embodiments, detecting that the load associated with the set of radio resources allocated for V2x communication exceeds the load threshold may comprise obtaining load information from a network node. In certain embodiments, the wireless device may initiate a timer in response to detecting that the load associated with the set of radio resources allocated for V2x communication exceeds the load threshold, and determine that the load associated with the set of radio resources allocated for V2x communication exceeds the load threshold for a threshold duration.

At step 408, upon detecting that the load associated with the set of radio resources allocated for V2x communication exceeds the load threshold, the wireless device selects a second transport format for use in a subsequent V2x transmission by the wireless device. For example, in certain embodiments, selecting the second transport format for use in a subsequent V2x transmission by the wireless device may comprise modifying the first transport format to the second transport format based at least in part on available radio resources of the set of radio resources allocated for V2x communication. As another example, selecting the second transport format for use in a subsequent V2x transmission by the wireless device may comprise selecting an alternative transport format as the second transport format, the alternative transport format configured for use when the load associated with the set of radio resources allocated for V2x communication exceeds the load threshold.

In certain embodiments, the second transport format may be adapted to available radio resources of the set of radio resources allocated for V2x communication. One or more radio parameters of the alternative transport format may be preconfigured in the wireless device. In certain embodiments, the method may include receiving one or more radio parameters of the alternative transport format from a network node. The first transport format and the second transport format may have at least one different radio parameter comprising one or more of a channel bandwidth, a power, a number of retransmissions, a modulation scheme, a coding scheme, and a resource hopping pattern.

At step 412, upon detecting that the load associated with the set of radio resources allocated for V2x communication exceeds the load threshold, the wireless device may drop a transmission based at least in part on one or more of a type of information carried by a channel and a priority of information carried by a channel. At step 416, upon detecting that the load associated with the set of radio resources allocated for V2x communication exceeds the load threshold, the wireless device may reduce a transmission rate based at least in part on one or more of a type of information carried by a channel and a priority of information carried by a channel.

Figure 5:
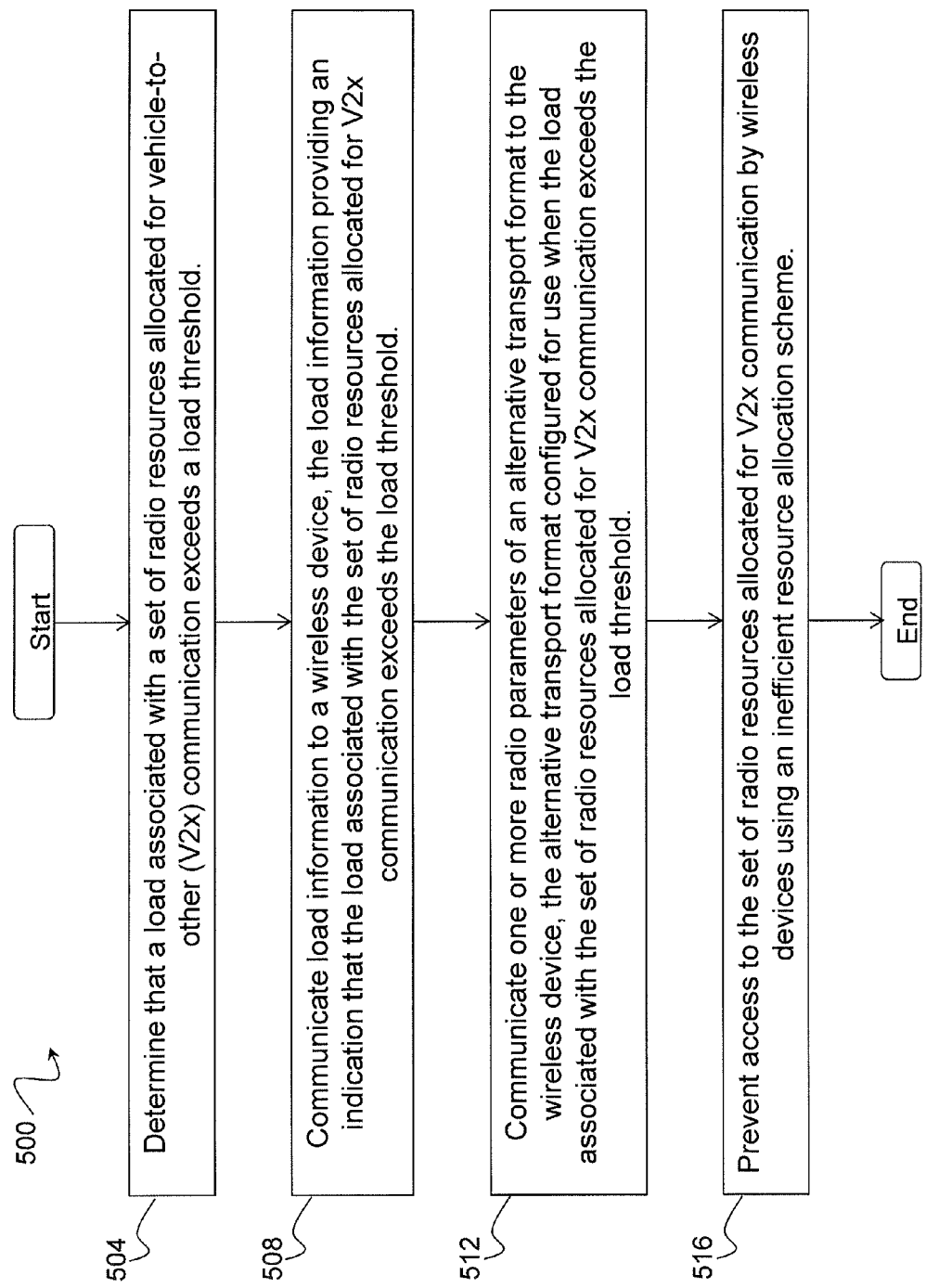
FIG. 5 is a flow chart of a method in a network node, in accordance with an embodiment.

FIG. 5 is a flow chart of a method in a network node, in accordance with an embodiment. The method begins at step 504, where a network node determines that a load associated with a set of radio resources allocated for vehicle-to-other (V2x) communication exceeds a load threshold. At step 508, the network node communicates load information to a wireless device, the load information providing an indication that the load associated with the set of radio resources allocated for V2x communication exceeds the load threshold. The load information may be associated with a subset of the resources allocated for V2x communication.

At step 512, the network node communicates one or more radio parameters of an alternative transport format to the wireless device, the alternative transport format configured for use when the load associated with the set of radio resources allocated for V2x communication exceeds the load threshold. In certain embodiments, the alternative transport format may be based at least in part on available resources of the set of radio resources allocated for V2x communication. The one or more radio parameters may include one or more of a channel bandwidth, a power, a number of retransmissions, a modulation scheme, a coding scheme, and a resource hopping pattern. The alternative transport format may have one or more of a smaller channel bandwidth than a first transport format associated with the wireless device, a smaller number of retransmissions than the first transport format associated with the wireless device, and a lower power than the first transport format associated with the wireless device.

At step 516, the network node may prevent access to the set of radio resources allocated for V2x communication by wireless devices using an inefficient resource allocation scheme. In certain embodiments, the inefficient resource allocation scheme may be a random resource allocation scheme.

Figure 6:
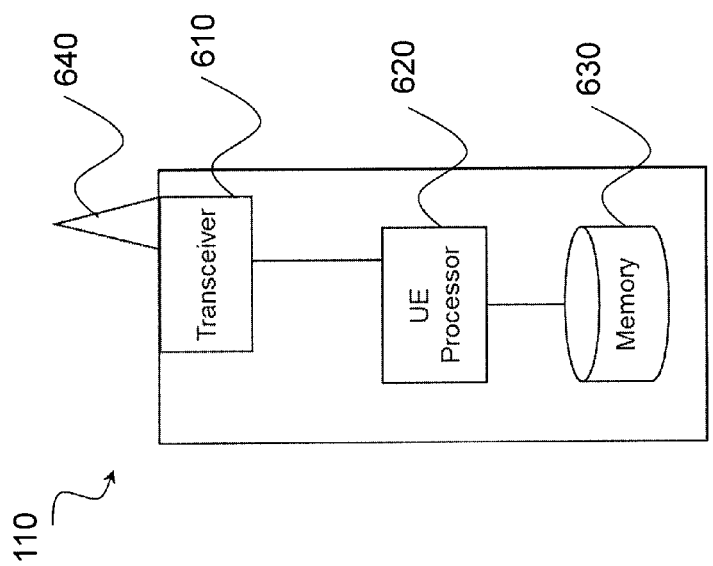
FIG. 6 is a block schematic of an exemplary wireless device, in accordance with certain embodiments.

FIG. 6 a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. In accordance with embodiments of the present disclosure, the UE may be inside, integrated into, or otherwise attached to a vehicle.

Wireless device 110 includes transceiver 610, processor 620, memory 630, and antenna 640. In some embodiments, transceiver 610 facilitates transmitting wireless signals to and receiving wireless signals from network node 115 (e.g., via antenna 640), processor 620 executes instructions to provide some or all of the functionality described above as being provided by wireless device 110, and memory 630 stores the instructions executed by processor 620.

Processor 620 may include any suitable combination of hardware and software implemented in one or more modules to execute instructions and manipulate data to perform some or all of the described functions of wireless device 110. In some embodiments, processor 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

The illustrated wireless device may represent communication devices that include any suitable combination of hardware and/or software. Other embodiments of wireless device 110 may include additional components beyond those shown in FIG. 6 that may be responsible for providing certain aspects of the wireless device's functionality, including any of the functionality described above and/or any additional functionality (including any functionality necessary to support the solution described above). In particular embodiments, some or all of the functionality described above as being provided by UEs, MTC, or M2M devices, and/or any other types of wireless communication devices, may be provided by processor 620 executing instructions stored on a computer-readable medium, such as memory 630. In particular embodiments, some or all of the functionality described above as being provided by mobile communication devices or other forms of UE may be provided by UE processor 620 executing instructions stored on a computer-readable medium, such as memory 630 shown in FIG. 6.

In certain embodiments, wireless device 110 may include one or more modules. For example, wireless device 110 may include a determining module, a communication module, a receiver module, an input module, a display module, and any other suitable modules. The determining module may perform the processing functions of wireless device 110. For example, the determining module may detect that a load associated with a set of radio resources allocated for V2x communication exceeds a load threshold. As another example, the determining module may select a second transport format for use in a subsequent V2x transmission by wireless device 110. As yet another example, the determining module may initiate a timer in response to detecting that the load associated with the set of radio resources allocated for V2x communication exceeds the load threshold, and determine that the load associated with the set of radio resources allocated for V2x communication exceeds the load threshold for a threshold duration. The determining module may include or be included in processor 620. The determining module may include analog and/or digital circuitry configured to perform any of the functions of the determining module and/or processor 620. The functions of the determining module described above may, in certain embodiments, be performed in one or more distinct modules.

The communication module may perform the transmission functions of wireless device 110. The communication module may transmit messages to one or more of network nodes 115 of network 100. The communication module may include a transmitter and/or a transceiver, such as transceiver 610. The communication module may include circuitry configured to wirelessly transmit messages and/or signals. In particular embodiments, the communication module may receive messages and/or signals for transmission from the determining module.

The receiving module may perform the receiving functions of wireless device 110. For example, the receiving module may receive one or more radio parameters of an alternative transport format from a network node. As another example, the receiving module may receive load information from a network node. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 7:
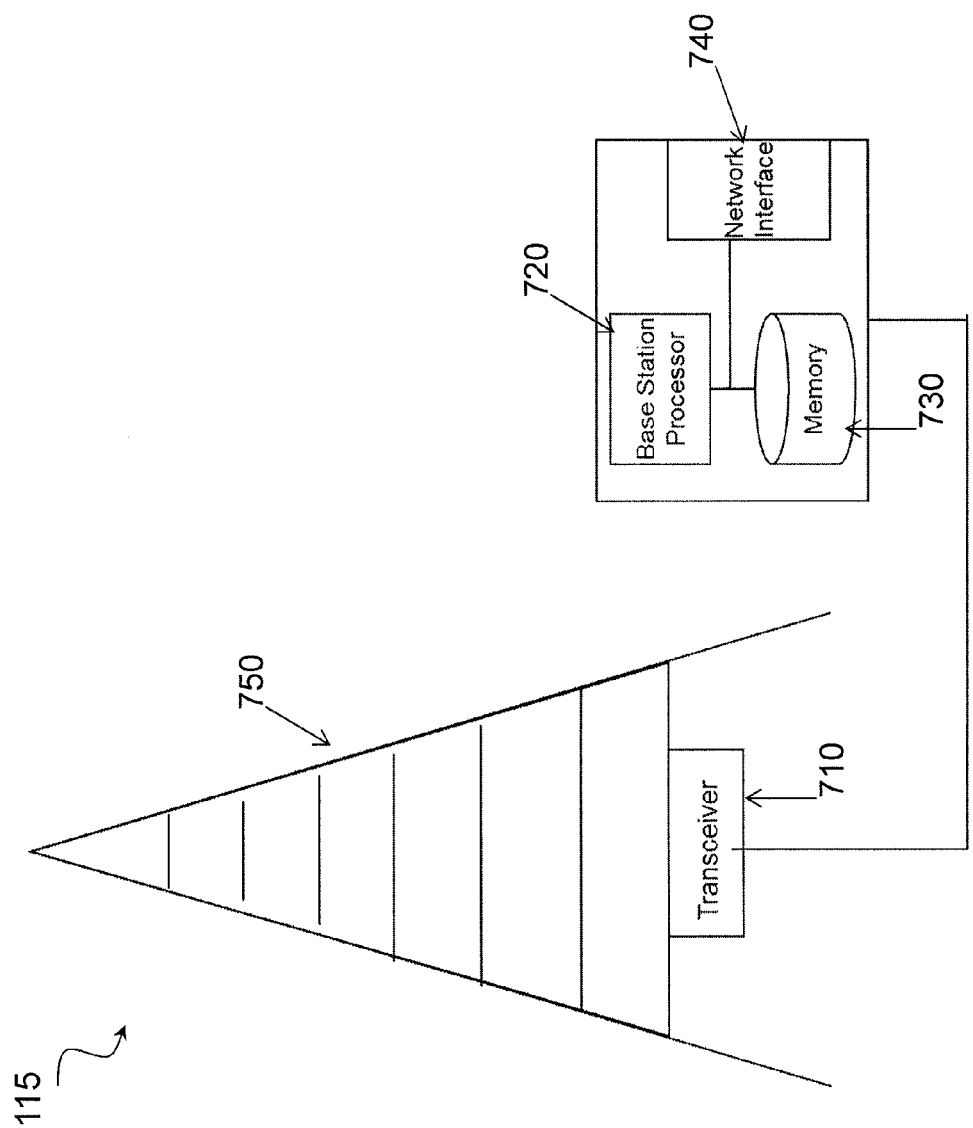
FIG. 7 is a block schematic of an exemplary radio network node, in accordance with certain embodiments.

FIG. 7 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 710, processor 720, memory 730, network interface 740, and antenna 750. In some embodiments, transceiver 710 facilitates transmitting wireless signals to and receiving wireless signals from wireless device 110 (e.g., via antenna 750), processor 720 executes instructions to provide some or all of the functionality described above as being provided by a network node 115, memory 730 stores the instructions executed by processor 720, and network interface 740 communicates signals to backend network components, such as a gateway, switch, router, Internet, Public Switched Telephone Network (PSTN), core network nodes or radio network controllers, etc.

Processor 720 may include any suitable combination of hardware and software implemented in one or more modules to execute instructions and manipulate data to perform some or all of the described functions of network node 115. In some embodiments, processor 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processor 720 and may refer to any suitable device operable to receive input for network node 115, send output from network node 115, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

In certain embodiments, network node 115 may include a determining module, a communication module, a receiving module, and any other suitable modules. In some embodiments, one or more of the determining module, communication module, receiving module, or any other suitable module may be implemented using one or more processors 720 of FIG. 7. In certain embodiments, the functions of two or more of the various modules may be combined into a single module.

The determining module may perform the processing functions of network node 115. For example, the determining module may determine that a load associated with a set of radio resources allocated for V2x communication exceeds a load threshold. As another example, the determining module may prevent access to the set of radio resources allocated for V2x communication by wireless devices using an inefficient resource allocation scheme. The functions of the determining module described above may, in certain embodiments, be performed in one or more distinct modules.

The communication module may perform the transmission functions of network node 115. The communication module may transmit messages to one or more of wireless devices 110. For example, the communication module may communicate load information to a wireless device 110. As another example, the communication module may communicate one or more radio parameters of an alternative transport format to the wireless device 110. The communication module may include a transmitter and/or a transceiver, such as transceiver 710. The communication module may include circuitry configured to wirelessly transmit messages and/or signals. In particular embodiments, the communication module may receive messages and/or signals for transmission from the determining module or any other module.

The receiving module may perform the receiving functions of network node 115. The receiving module may receive any suitable information from a wireless device. The receiving module may include a receiver and/or a transceiver. The receiving module may include circuitry configured to wirelessly receive messages and/or signals. In particular embodiments, the receiving module may communicate received messages and/or signals to the determining module or any other suitable module.

The illustrated network node 115 of FIG. 7 may represent network nodes that include any suitable combination of hardware and/or software. Other embodiments of network node 115 may include additional components beyond those shown in FIG. 7 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. In particular embodiments, some or all of the functionality described above as being provided by a network node 115, base station, a node B, an enhanced node B, and/or any other type of network node may be provided by the node processor 720 executing instructions stored on a computer-readable medium, such as memory 730 shown in FIG. 7.

Figure 8:
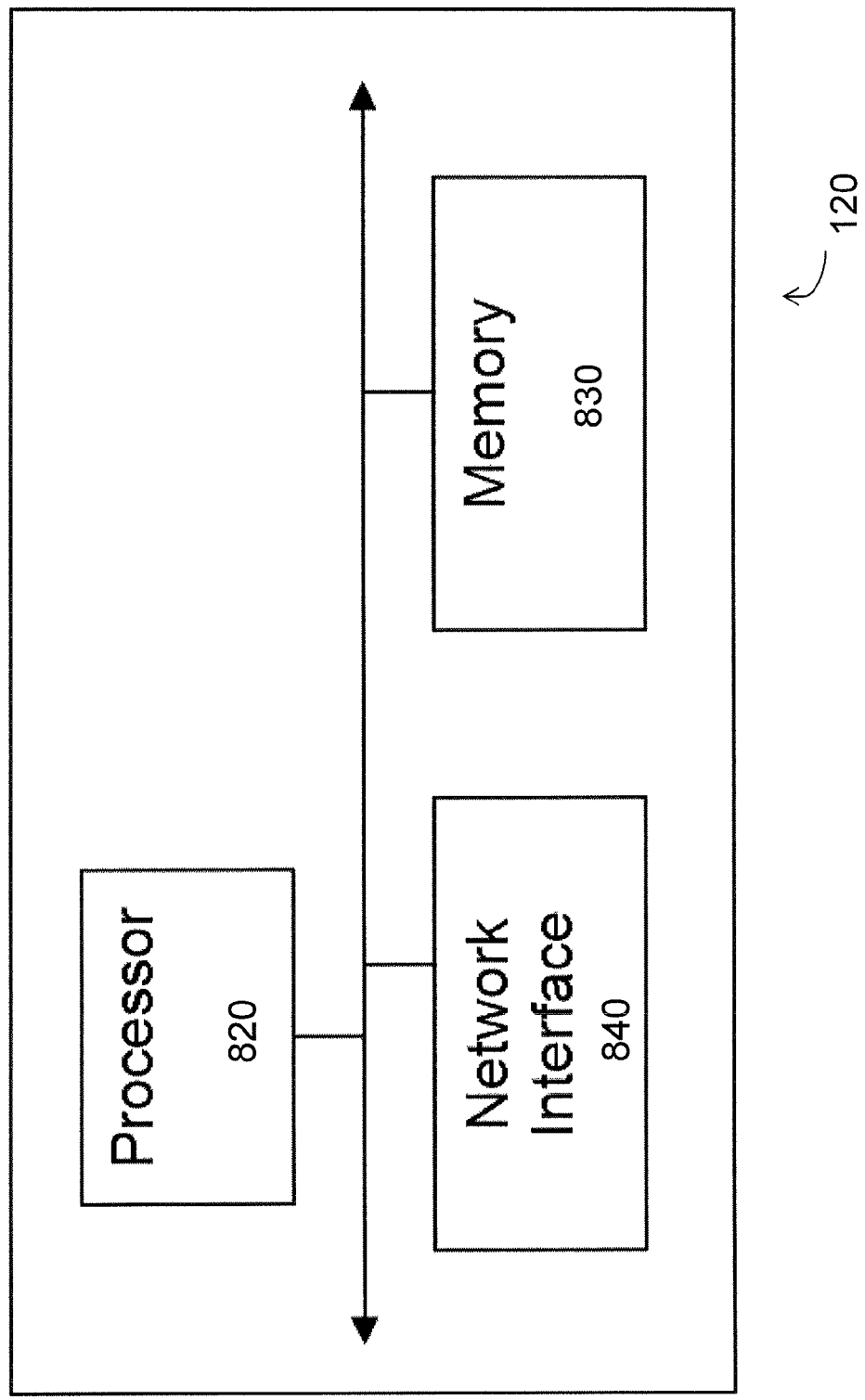
FIG. 8 is a block schematic of an exemplary radio network controller or core network node, in accordance with certain embodiments.

FIG. 8 is a block schematic of an exemplary radio network controller or core network node 120, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 120 include processor 820, memory 830, and network interface 840. In some embodiments, processor 820 executes instructions to provide some or all of the functionality described above as being provided by the network node, memory 830 stores the instructions executed by processor 820, and network interface 840 communicates signals to any suitable node, such as a gateway, switch, router, Internet, Public Switched Telephone Network (PSTN), network nodes 115, radio network controllers or core network nodes 120, etc.

Processor 820 may include any suitable combination of hardware and software implemented in one or more modules to execute instructions and manipulate data to perform some or all of the described functions of the radio network controller or core network node 120. In some embodiments, processor 920 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the solution described above).

Modifications, additions, or omissions may be made to the systems and apparatuses disclosed herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
BSM Basic Safety Message
BW Bandwidth
CAM Cooperative Awareness Message
D2D Device-to-Device Communication
DENM Decentralized Environmental Notification Message
DSRC Dedicated Short-Range Communications
eNB eNodeB
ETSI European Telecommunications Standards Institute
FDMA Frequency-Division Multiple Access
LTE Long-Term Evolution
NW Network
P2I Pedestrian-to-Infrastructure
P2V Pedestrian-to-Vehicle
TDMA Time-Division Multiple Access
TF Transport Format
SAE Society of the Automotive Engineers
UE User Equipment
V2I Vehicle-to-Infrastructre
V2P Vehicle-to-Pedestrian
V2V Vehicle-to-vehicle communication
V2x Vehicle-to-anything-you-can-imagine

The invention claimed is:

1. A method in a wireless device, comprising:
detecting that a load associated with a set of radio resources allocated for vehicle-to-other (V2x) communication exceeds a load threshold, the wireless device having a first transport format for V2x transmissions; and
upon detecting that the load associated with the set of radio resources allocated for V2x communication exceeds the load threshold, selecting a second transport format for use in a subsequent V2x transmission by the wireless device, wherein the second transport format comprises one or more radio parameters configured to reduce an amount of resource fragmentation within the set of radio resources allocated for V2x communication that occurs when the load associated with the set of radio resources allocated for V2x communication exceeds the load threshold, the one or more radio parameters comprising at least a channel bandwidth for the second transport format that is different from a channel bandwidth of the first transport format.

2. The method of claim 1, wherein selecting a second transport format for use in a subsequent V2x transmission by the wireless device comprises modifying the first transport format to the second transport format based at least in part on available radio resources of the set of radio resources allocated for V2x communication.

3. The method of claim 1, wherein selecting a second transport format for use in a subsequent V2x transmission by the wireless device comprises selecting an alternative transport format, the alternative transport format configured for use when the load associated with the set of radio resources allocated for V2x communication exceeds the load threshold.

4. The method of claim 3, wherein one or more radio parameters of the alternative transport format are preconfigured in the wireless device.

5. The method of claim 3, further comprising receiving one or more radio parameters of the alternative transport format from a network node.

6. The method of claim 1, further comprising:
upon detecting that the load associated with the set of radio resources allocated for V2x communication exceeds the load threshold, dropping a transmission based at least in part on one or more of a type of information carried by a channel and a priority of information carried by a channel.

7. The method of claim 1, further comprising:
upon detecting that the load associated with the set of radio resources allocated for V2x communication exceeds the load threshold, reducing a transmission rate based at least in part on one or more of a type of information carried by a channel and a priority of information carried by a channel.

8. The method of claim 1, wherein detecting that the load associated with the set of radio resources allocated for V2x communication exceeds the load threshold comprises obtaining load information from a network node.

9. The method of claim 1, further comprising:
initiating a timer in response to detecting that the load associated with the set of radio resources allocated for V2x communication exceeds the load threshold; and
determining that the load associated with the set of radio resources allocated for V2x communication exceeds the load threshold for a threshold duration.

10. The method of claim 1, wherein the second transport format is adapted to available radio resources of the set of radio resources allocated for V2x communication.

11. The method of claim 1, wherein the first transport format and the second transport format have at least one additional different radio parameter comprising one or more of a power, a number of retransmissions, a modulation scheme, a coding scheme, and a resource hopping pattern.

12. A method in a network node, comprising:
allocating a set of contention-based radio resources for vehicle-to-other (V2x) communication from which a plurality of wireless devices may select resources for use in V2x communication, wherein V2x communication comprises communication to or from a vehicle;
determining that a load associated with the set of radio resources allocated for V2x communication exceeds a load threshold; and
communicating one or more radio parameters of an alternative transport format to a at least one wireless device of the plurality of wireless devices, the alternative transport format configured for use when the load associated with the set of radio resources allocated for V2x communication exceeds the load threshold, wherein the one or more radio parameters of the alternative transport format comprise at least a channel bandwidth for the alternative transport format that is different from a channel bandwidth of a first transport format used by the wireless device when the load associated with the set of radio resources allocated for V2x communication does not exceed the load threshold.

13. The method of claim 12, further comprising communicating load information to the wireless device, the load information providing an indication that the load associated with the set of radio resources allocated for V2x communication exceeds the load threshold.

14. The method of claim 13, wherein the load information is associated with a subset of the resources allocated for V2x communication.

15. The method of claim 12, wherein the alternative transport format is based at least in part on available resources of the set of radio resources allocated for V2x communication.

16. The method of claim 12, wherein the one or more radio parameters further comprise one or more of a power, a number of retransmissions, a modulation scheme, a coding scheme, and a resource hopping pattern.

17. The method of claim 12, further comprising preventing access to the set of radio resources allocated for V2x communication by wireless devices using an inefficient resource allocation scheme.

18. The method of claim 17, wherein the inefficient resource allocation scheme comprises a random resource allocation scheme.

19. The method of claim 12, wherein the alternative transport format comprises one or more of:
a smaller channel bandwidth than the first transport format of the wireless device;
a smaller number of retransmissions than the first transport format of the wireless device; and
a lower power than the first transport format of the wireless device.

20. A wireless device, comprising:
one or more processors configured to:
detect that a load associated with a set of radio resources allocated for vehicle-to-other (V2x) communication exceeds a load threshold, the wireless device having a first transport format for V2x transmissions; and
upon detecting that the load associated with the set of radio resources allocated for V2x communication exceeds the load threshold, select a second transport format for use in a subsequent V2x transmission by the wireless device, wherein the second transport format comprises one or more radio parameters configured to reduce an amount of resource fragmentation within the set of radio resources allocated for V2x communication that occurs when the load associated with the set of radio resources allocated for V2x communication exceeds the load threshold, the one or more radio parameters comprising at least a channel bandwidth for the second transport format that is different from a channel bandwidth of the first transport format.

21. The wireless device of claim 20, wherein the one or more processors configured to select a second transport format for use in a subsequent V2x transmission by the wireless device comprise one or more processors configured to modify the first transport format to the second transport format based at least in part on available radio resources of the set of radio resources allocated for V2x communication.

22. The wireless device of claim 20, wherein the one or more processors configured to select a second transport format for use in a subsequent V2x transmission by the wireless device comprise one or more processors configured to select an alternative transport format as the second transport format, the alternative transport format configured for use when the load associated with the set of radio resources allocated for V2x communication exceeds the load threshold.

23. The wireless device of claim 22, wherein one or more radio parameters of the alternative transport format are preconfigured in the wireless device.

24. The wireless device of claim 22, wherein the one or more processors are further configured to receive one or more radio parameters of the alternative transport format from a network node.

25. The wireless device of claim 20, wherein the one or more processors are further configured to:
upon detecting that the load associated with the set of radio resources allocated for V2x communication exceeds the load threshold, drop a transmission based at least in part on one or more of a type of information carried by a channel and a priority of information carried by a channel.

26. The wireless device of claim 20, wherein the one or more processors are further configured to:
upon detecting that the load associated with the set of radio resources allocated for V2x communication exceeds the load threshold, reduce a transmission rate based at least in part on one or more of a type of information carried by a channel and a priority of information carried by a channel.

27. The wireless device of claim 20, wherein the one or more processors configured to detect that the load associated with the set of radio resources allocated for V2x communication exceeds the load threshold comprise one or more processors configured to obtain load information from a network node.

28. The wireless device of claim 20, wherein the one or more processors are further configured to:
initiate a timer in response to detecting that the load associated with the set of radio resources allocated for V2x communication exceeds the load threshold; and
determine that the load associated with the set of radio resources allocated for V2x communication exceeds the load threshold for a threshold duration.

29. The wireless device of claim 20, wherein the second transport format is adapted to available radio resources of the set of radio resources allocated for V2x communication.

30. The wireless device of claim 20, wherein the first transport format and the second transport format have at least one additional different radio parameter comprising one or more of a power, a number of retransmissions, a modulation scheme, a coding scheme, and a resource hopping pattern.

31. A network node, comprising:
one or more processors configured to:
allocate a set of contention-based radio resources for vehicle-to-other (V2x) communication from which a plurality of wireless devices may select resources for use in V2x communication, wherein V2x communication comprises communication to or from a vehicle;
determine that a load associated with the set of radio resources allocated for V2x communication exceeds a load threshold; and
communicate one or more radio parameters of an alternative transport format to at least one wireless device of the plurality of wireless devices, the alternative transport format configured for use when the load associated with the set of radio resources allocated for V2x communication exceeds the load threshold, wherein the one or more radio parameters of the alternative transport format comprise at least a channel bandwidth for the alternative transport format that is different from a channel bandwidth of a first transport format used by the wireless device when the load associated with the set of radio resources allocated for V2x communication does not exceed the load threshold.

32. The network node of claim 31, wherein the one or more processors are further configured to communicate load information to the wireless device, the load information providing an indication that the load associated with the set of radio resources allocated for V2x communication exceeds the load threshold.

33. The network node of claim 32, wherein the load information is associated with a subset of the resources allocated for V2x communication.

34. The network node of claim 31, wherein the alternative transport format is based at least in part on available resources of the set of radio resources allocated for V2x communication.

35. The network node of claim 31, wherein the one or more radio parameters further comprise one or more of a power, a number of retransmissions, a modulation scheme, a coding scheme, and a resource hopping pattern.

36. The network node of claim 31, wherein the one or more processors are further configured to prevent access to the set of radio resources allocated for V2x communication by wireless devices using an inefficient resource allocation scheme.

37. The network node of claim 36, wherein the inefficient resource allocation scheme comprises a random resource allocation scheme.

38. The network node of claim 31, wherein the alternative transport format comprises one or more of:
a smaller channel bandwidth than the first transport format of the wireless device;
a smaller number of retransmissions than the first transport format of the wireless device; and
a lower power than the first transport format of the wireless device.

* * * * *